US009971778B2

(12) United States Patent
Vickers et al.

(10) Patent No.: US 9,971,778 B2
(45) Date of Patent: *May 15, 2018

(54) TRANSLATING PROGRAMMING LANGUAGE PATTERNS INTO DATABASE SCHEMA PATTERNS

(71) Applicant: Microsoft Technology Licensing, LLC, Redmond, WA (US)

(72) Inventors: Arthur John Cerdic Vickers, Redmond, WA (US); Diego Bernardo Vega, Sammamish, WA (US); Rowan Laurence Miller, Kirkland, WA (US); Andrew John Peters, Sammamish, WA (US); Timothy A. Laverty, Seattle, WA (US); Jeffrey Michael Derstadt, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/000,020

(22) Filed: Jan. 18, 2016

(65) Prior Publication Data

US 2016/0132510 A1 May 12, 2016

Related U.S. Application Data

(63) Continuation of application No. 13/179,914, filed on Jul. 11, 2011, now Pat. No. 9,274,773.

(51) Int. Cl.
*G06F 7/00* (2006.01)
*G06F 17/30* (2006.01)
*G06F 9/45* (2006.01)

(52) U.S. Cl.
CPC ......... *G06F 17/30076* (2013.01); *G06F 8/51* (2013.01); *G06F 17/30292* (2013.01);
(Continued)

(58) Field of Classification Search
USPC ........................................ 707/760, 803, 681
See application file for complete search history.

(56) References Cited

U.S. PATENT DOCUMENTS 5,291,583 A 3/1994 Bapat
6,101,502 A 8/2000 Huebner et al.
(Continued)

OTHER PUBLICATIONS

"Common Language Runtime (CLR) Integration Programming Concepts", Retrieved from <<http://web.archive.org/web/20110624050323/http://msdn.microsoft.com/en-us/library/ms131102.aspx>>, Retrieved Date: Jun. 1, 2011, 2 Pages.
(Continued)

*Primary Examiner* — Cheyne D Ly
(74) *Attorney, Agent, or Firm* — Wade IP Law LLC

(57) ABSTRACT

Techniques are described herein that are capable of translating programming language patterns into database schema patterns. Examples of a programming language pattern include but are not limited to a source code pattern, an intermediate language code pattern, metadata associated with a source code pattern, metadata associated with an intermediate language code pattern, or any combination thereof. The programming language patterns may define objects that are included in an object model. Database schema patterns that define a database are automatically (e.g., inferentially) created based on respective programming language patterns that define objects of an object model. The programming language patterns are automatically mapped to the respective database schema patterns.

20 Claims, 5 Drawing Sheets

(52) U.S. Cl.
CPC .. *G06F 17/30294* (2013.01); *G06F 17/30339* (2013.01); *G06F 17/30498* (2013.01); *G06F 17/30917* (2013.01)

(56) References Cited

U.S. PATENT DOCUMENTS

| | | | |
|---|---|---|---|
| 6,631,519 B1 | 10/2003 | Nicholson et al. | |
| 6,941,316 B2 | 9/2005 | Venkatesh et al. | |
| 7,526,503 B2 | 4/2009 | Bernstein et al. | |
| 7,685,155 B2 | 3/2010 | Cengiz et al. | |
| 7,739,556 B1 | 6/2010 | Duluk, Jr. et al. | |
| 8,024,701 B2 * | 9/2011 | Cote | G06F 8/24 717/106 |
| 8,756,258 B2 * | 6/2014 | Mazo | G06F 8/36 703/13 |
| 2003/0097637 A1 * | 5/2003 | Tozawa | G06F 17/2247 715/235 |
| 2004/0044678 A1 * | 3/2004 | Kalia | G06F 17/30595 |
| 2004/0172591 A1 | 9/2004 | Rothschiller et al. | |
| 2005/0060645 A1 * | 3/2005 | Raghavachari | G06F 17/2725 715/237 |
| 2005/0177551 A1 | 8/2005 | Rathakrishnan et al. | |
| 2005/0278709 A1 | 12/2005 | Sridhar et al. | |
| 2006/0085451 A1 | 4/2006 | Pal et al. | |
| 2007/0174317 A1 | 7/2007 | Bangel et al. | |
| 2008/0104105 A1 * | 5/2008 | Heifets | G06F 17/2247 |
| 2008/0154939 A1 | 6/2008 | Mutschler et al. | |
| 2010/0083092 A1 | 4/2010 | Schuller et al. | |
| 2010/0332548 A1 | 12/2010 | Gibson et al. | |
| 2012/0290940 A1 | 11/2012 | Quine | |
| 2012/0330878 A1 | 12/2012 | Vickers et al. | |

OTHER PUBLICATIONS

"EF Feature CTP4 Released!", Retrieved from <<http://blogs.msdn.com/b/adonet/archive/2010/07/14/ctp4announcement.aspx>>, Jul. 14, 2010, 4 Pages.

"Fluent Configuration—Fluent NHibernate", Retrieved from <<http://web.archive.org/web/20110726061019/http://wiki.fluentnhibernate.org/Fluent_configuration>>, Retrieved Date: Jul. 11, 2011, 4 Pages.

"Getting started—Fluent NHibernate", Retrieved from <<http://web.archive.org/web/20110714235210/http://wiki.fluentnhibernate.org/Getting_started>>, Retrieved Date: Jul. 11, 2011, 13 Pages.

"Mindscape—LightSpeed", Retrieved from <<http://web.archive.org/web/20110712010627/http://www.mindscapehq.com/products/lightspeed>>, Retrieved Date: Jul. 11, 2011, 2 Pages.

"SQL Server Modeling Services Schemas", Retrieved from <<http://msdn.microsoft.com/en-us/library/dd857586(v=vs.85).aspx>>, Retrieved Date: Jun. 2, 2011, 5 Pages.

"Final Office Action Issued in U.S. Appl. No. 13/179,914", dated May 9, 2013, 13 Pages.

"Final Office Action Issued in U.S. Appl. No. 13/179,914", dated Aug. 26, 2013, 13 Pages.

"Final Office Action Issued in U.S. Appl. No. 13/179,914", dated Nov. 20, 2014, 14 Pages.

"Non-Final Office Action Issued in U.S. Appl. No. 13/179,914", dated May 6, 2015, 15 Pages.

"Non-Final Office Action Issued in U.S. Appl. No. 13/179,914", dated Jun. 16, 2014, 13 Pages.

"Non-Final Office Action Issued in U.S. Appl. No. 13/179,914", dated Dec. 7, 2012, 11 Pages.

"Notice of Allowance Issued in U.S. Appl. No. 13/179,914", dated Sep. 23, 2015, 12 Pages.

Atzeni, et al., "A Runtime Approach to Model-Independent Schema and Data Translation", In Proceedings of the 12th International Conference on Extending Database Technology: Advances in Database Technology, Mar. 24, 2009, 12 Pages.

Liu, et al., "Automating Transition from Use-Cases to Class Model", In IEEE Canadian Conference on Electrical and Computer Engineering, vol. 2, May 4, 2003, pp. 831-834.

"Final Office Action Issued in U.S. Appl. No. 13/179,629", dated Mar. 16, 2016, 10 Pages.

* cited by examiner

TRANSLATING PROGRAMMING LANGUAGE PATTERNS INTO DATABASE SCHEMA PATTERNS

CROSS-REFERENCE TO RELATED APPLICATIONS

This application is a continuation of U.S. patent application Ser. No. 13/179,914 filed 11 Jul. 2011, the entirety of which is incorporated by reference herein.

This application is related to the following applications: U.S. patent application Ser. No. 13/166,825 filed 23 Jun. 2011 entitled "Conventions for Inferring Data Models", as well as the following applications co-filed with U.S. patent application Ser. No. 13/179,914: U.S. patent application Ser. No. 13/179,598 filed 11 Jul. 2011 entitled "Object-Relational Mapped Database Initialization", U.S. patent application Ser. No. 13/179,601 filed 11 Jul. 2011 entitled "Fluent API Patterns for Managing Object Persistence", and U.S. patent application Ser. No. 13/179,629 filed 11 Jul. 2011 entitled "Incremental Inference for Developing Data Models".

BACKGROUND

Creating an application in a general-purpose programming language that maps to a relational database for data storage traditionally involves substantial manual effort by a human developer. For example, conventional techniques for creating a database for use with regard to an application typically involve the human developer explicitly setting up the database and manually ensuring mapping of the database with regard to the application and other configuration of the database. For instance, the human developer may explicitly draft code to map relational schema that is associated with the database to constructs of the programming language. Accordingly, these conventional techniques may place a substantial burden on the human developer to understand the mapping and configuration to be used for creating the database, to make appropriate choices with respect to creating the database, and/or to be capable of implementing the mapping and configuration so that the database functions as intended.

SUMMARY

Various approaches are described herein for, among other things, translating programming language patterns into database schema patterns. Examples of a programming language pattern include but are not limited to a source code pattern, an intermediate language code pattern, metadata associated with a source code pattern, metadata associated with an intermediate language code pattern, or any combination thereof. The programming language patterns may define objects that are included in an object model.

An example method is described in which database schema patterns that define a database are automatically (e.g., inferentially) created based on respective programming language patterns that define objects of an object model. For instance, the database schema patterns may be automatically created at runtime of an application having intermediate code that includes the programming language patterns. The programming language patterns are automatically mapped to the respective database schema patterns.

An example system is described that includes creation logic and mapping logic. The creation logic is configured to automatically (e.g., inferentially) create database schema patterns that define a database based on respective programming language patterns that define objects of an object model. The mapping logic is configured to automatically map the programming language patterns to the respective database schema patterns.

An example computer program product is described that comprises a computer-readable medium having computer program logic recorded thereon for enabling a processor-based system to translate programming language patterns into database schema patterns. The computer program product comprises a first program logic module and a second program logic module. The first program logic module is for enabling the processor-based system to automatically (e.g., inferentially) create database schema patterns that define a database based on respective programming language patterns that define objects of an object model. The second program logic module is for enabling the processor-based system to automatically map the programming language patterns to the respective database schema patterns.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
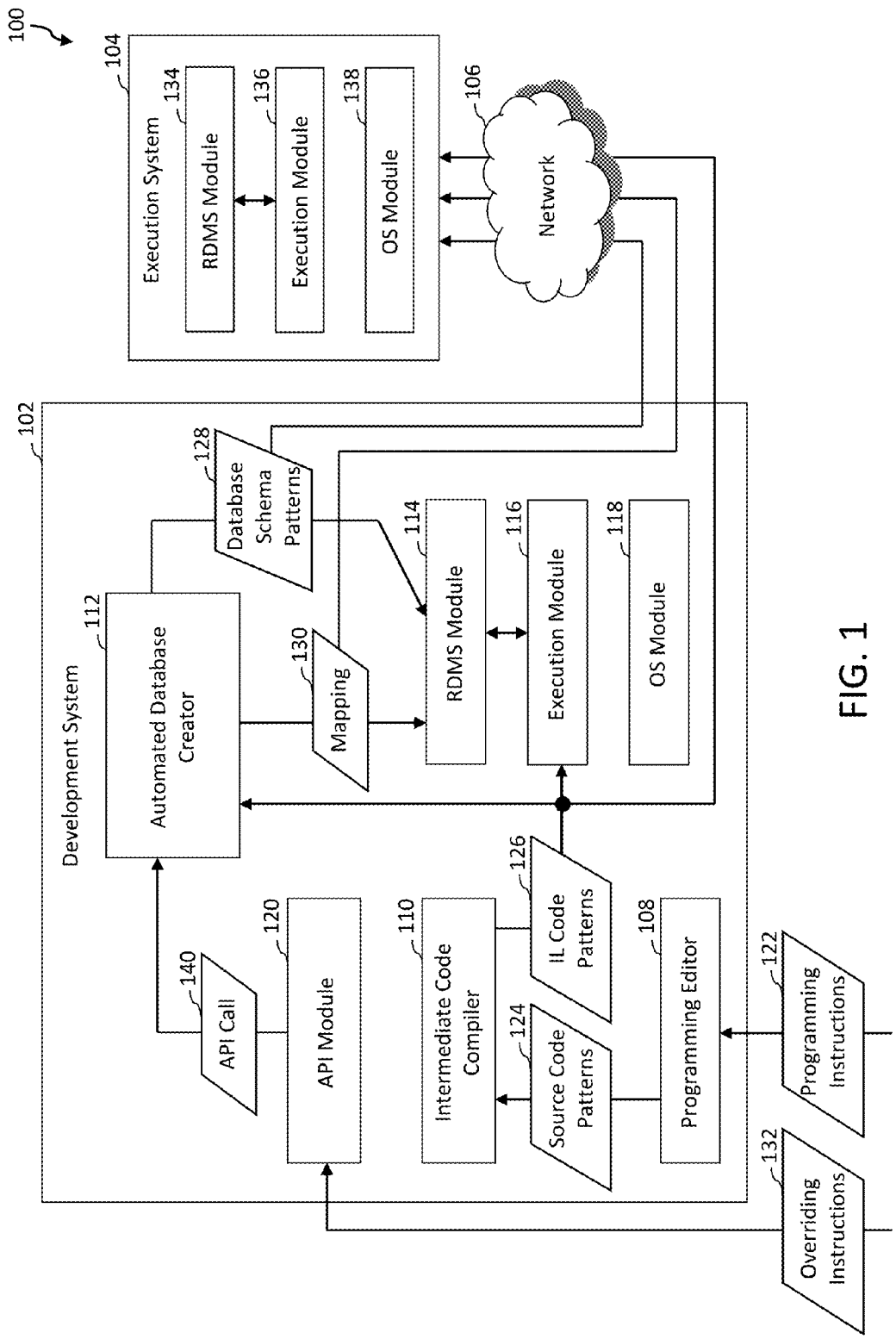
FIG. 1 is a block diagram of an example database creation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of translating programming language patterns into database schema patterns. Examples of a programming language pattern include but are not limited to a source code pattern, an intermediate language code pattern, metadata associated with a source code pattern, metadata associated with an intermediate language code pattern, or any combination thereof. The programming language patterns may define objects that are included in an object model. In accordance with example embodiments, database schema patterns that define a database are automatically created based on respective programming language patterns that define objects of an object model. In further accordance with the example embodiments, the programming language patterns are automatically mapped to the respective database schema patterns.

In accordance with some example embodiments, the schema patterns that define the database are inferentially created based on the respective programming language patterns. As used herein, the term "inferential" may mean "partially inferential" or "entirely inferential". It will be recognized that "partially inferential" may mean partially inferential and partially explicit. Accordingly, the schema patterns may be said to be inferentially created based on the respective programming language patterns even if a portion (but less than all) of the schema patterns is explicitly created. In some example embodiments, conventions are used for inferring the schema patterns based on the programming language patterns. Some example techniques for using conventions to infer data models are described in U.S. patent application Ser. No. 13/166,825 filed on Jun. 23, 2011 and titled "Conventions for Inferring Data Models", the entirety of which is incorporated herein by reference.

Example techniques described herein have a variety of benefits as compared to conventional techniques for creating a database. For instance, the techniques may enable creation of database structures by inferring those structures from programming language constructs. Some of the techniques may enable selective overriding of default database creation conventions. For instance, some portions of a database may be created and/or edited automatically based on the programming language constructs (e.g., by convention), and other portions may be created explicitly. The techniques described herein may reduce (e.g., eliminate) manual effort of a human developer in order to create a database for an application. For instance, a human developer need not necessarily be capable of understanding and/or implementing the mapping and configuration to be used for creating the database. A human developer need not necessarily make choices with respect to creating the database. Moreover, the techniques described herein may consume less time than the conventional techniques.

FIG. 1 is a block diagram of an example database creation system 100 in accordance with an embodiment. Generally speaking, database creation system 100 operates to create an application and to automatically translate programming language patterns of the application into database schema patterns. As shown in FIG. 1, database creation system 100 includes a development system 102 and an execution system 104. Communication between development system 102 and execution system 104 is carried out over network 106 using well-known network communication protocols. Network 106 may be a wide-area network (e.g., the Internet), a local area network (LAN), another type of network, or a combination thereof.

Development system 102 is a processing system that is capable of translating programming language patterns into database schema patterns. An example of a processing system is a system that includes at least one processor that is capable of manipulating data in accordance with a set of instructions. For instance, a processing system may be a computer (e.g., a desktop computer, laptop computer, tablet computer, netbook, etc.), a personal digital assistant, etc.

Development system 102 includes a programming editor 108, an intermediate code compiler 110, an automated database creator 112, a relational database management system (RDMS) module 114, an execution module 116, an operating system (OS) module 118, and an application programming interface (API) module 120. Programming editor 108 is configured to generate source code, which includes source code patterns 124, of an application based on programming instructions 122 that are received from a user (e.g., an application developer). For example, the source code may be uncompiled code. The source code may define an object model that includes code constructs, which may include but are not limited to classes, attributes, inheritance, etc. The source code may be any suitable type of source code (e.g., visual basic, C++, C#, etc.). Using C# for illustrative purposes, classes may appear as follows:

```
public class Product
{
    public int Id { get; set; }
    public string Name { get; set; }
    public Category Category { get; set; }
}
public class Category
{
    public string Id { get; set; }
    public ICollection<Product> Products { get; set; }
}
```

These classes are provided for illustrative purposes and are not intended to be limiting.

Intermediate code compiler 110 is configured to compile the source code to provide intermediate language code that includes intermediate language (IL) code patterns 126. The intermediate language code may include mappings and other metadata that relate back to names used in the source code. The IL code patterns 126 may define objects that are included in an object model.

Automated database creator 112 is configured to automatically (e.g., inferentially) create database schema patterns 128 that define a database based on respective programming language patterns, such as the source code patterns 124, the IL code patterns 126, metadata associated with the source code patterns 124, metadata associated with the IL code patterns, etc. For example, automated database creator 112 may automatically infer the database schema patterns 128 based on the respective programming language patterns. In another example, automated database creator 112 may automatically create the database schema patterns 128 at runtime of an application having intermediate code that includes the IL code patterns 126. Automated database creator 112 is further configured to automatically map the programming language patterns to the respective database schema patterns 128. Automated database creator 112 provides mapping 130, which indicates the mapping of the programming language patterns to the respective database schema patterns 128.

For example, when classes are used with an Entity Framework™ (EF) context at runtime, automated database creator 112 may execute a runtime process that maps the database to the IL code patterns 126. In accordance with this example, the runtime process may use the IL code patterns 126 to infer an appropriate database schema. An example of an EF context is as follows:

```
public class MyContext : DbContext
{
    public DbSet<Product> Products { get; set; }
    public DbSet<Category> Categories{ get; set; }
}
```

The programming language constructs may use annotations, inheritance, or other programming language constructs to influence the database. Following are some examples of programming language constructs:

```
public class Product
{
//the Key attribute will be used to determine the primary key for the table
[Key]
    public int MyPkey { get; set; }
//the StringLength attribute will be used to set the length of the column in
//the database.
[StringLength(25)]
    public string Name { get; set; }
    public Category Category { get; set; }
}
//inheritance is used to setup a TPH hierarchy for the Food and Product
classes
//(instances of these classes will be stored in the same table.
public class Food : Product
{
    public int Id { get; set; }
[Required]
    public string Name { get; set; }
    public Category Category { get; set; }
}
```

Automated database creator 112 may use the programming language constructs to influence or control the database structures. This coupled with a runtime that understands the conventions and "overrides" for database control may be helpful to users building applications.

Automated database creator 112 is shown in FIG. 1 to receive the IL code patterns 126 from intermediate code compiler 110 for illustrative purposes and is not intended to be limiting. It will be recognized that automated database creator 112 may receive metadata associated with the IL code patterns 126 from intermediate code compiler 110 in addition to or in lieu of the IL code patterns 126. Moreover, automated database creator 112 may receive the source code patterns 124 and/or metadata associated therewith from programming editor 108 in addition to or in lieu of receiving the IL code patterns 126 and/or metadata associated therewith from intermediate code compiler 110.

RDMS module 114 executes a relational database management system, which controls maintenance and use of the database that is defined by database schema patterns 128. Controlling maintenance and use of the database may involve translating the database schema patterns 128 back into the programming language patterns. The relational database management system may use the mapping 130 received from automated database creator 112 to translate the database schema patterns 128 back into the programming language patterns.

It will be recognized that RDMS module 114 may include automated database creator 112, though the scope of the example embodiments is not limited in this respect.

Execution module 116 is configured to execute the intermediate code, including the IL code patterns 126, or a compiled version thereof. For example, execution module 116 may compile the intermediate code at runtime into machine code that is executable. In accordance with this example, execution module 116 may execute the machine code. Execution module 116 may be implemented as a debugger or as an instruction set simulator to execute the intermediate code in a debug mode for purposes of testing and/or debugging the application. In accordance with this example, execution module 116 may monitor performance of the application during its execution in order to identify and/or resolve programming bugs that hinder the performance. In another example, execution module 116 may execute the intermediate code in a production mode, as opposed to a debug mode.

OS module 118 executes an operating system, which performs operations that may include but are not limited to managing computer hardware resources, providing services for execution of applications, etc. on development system 102. Examples of an operating system include but are not limited to Berkeley Software Distribution™ (BSD), developed and distributed by the Computer Systems Research Group (CSRG) of the University of California, Berkeley, or descendants thereof; Linux developed and distributed under the GNU Project; Mac OS® developed and distributed by Apple Inc., Microsoft Windows® developed and distributed by Microsoft Corporation; and UNIX™ developed and distributed by AT&T.

API module 120 is configured to provide API calls, such as API call 140, to automated database creator 112 based on overriding instructions 132 that are received from a user. Each API call may include information regarding an override mapping between one or more of the programming language patterns and one or more of the database schema patterns 128. Override mapping specifies a mapping that overrides or takes precedence over the mapping that is automatically performed by automated database creator 112 in response to creation of the database. Accordingly, mapping 130, which is provided by automated database creator 112, may be based on one or more of such API calls.

API calls may include any suitable type of information, including but not limited to names of foreign keys and/or candidate keys for a designated table in the database, indications of whether relationships are optional or required, indications of nullability of foreign keys, etc.

It will be recognized that any one or more of programming editor 108, intermediate code compiler 110, automated database creator 112, RDMS module 114, execution module 116, and/or API module 120 may be cloud-based. For instance, any one or more of the aforementioned elements of development system 102 may be accessible to a user via a network, such as network 106.

It will be further recognized that development system 100 may not include one or more of programming editor 108, intermediate code compiler 110, automated database creator 112, RDMS module 114, execution module 116, OS module 118, and/or API module 120. Furthermore, development system 100 may include modules in addition to or in lieu of programming editor 108, intermediate code compiler 110, automated database creator 112, RDMS module 114, execution module 116, OS module 118, and/or API module 120.

Execution system 104 is shown in FIG. 1 to illustrate that the IL code patterns 126 may be executed by a system in addition to or in lieu of development system 102. Execution system 104 is a processing system that is capable of executing IL code patterns, such as IL code patterns 126. Execution system 104 receives the IL code patterns 126, the database schema patterns 128, and the mapping 130 via network 106. Execution system 104 includes RDMS module 134, execution module 136, and OS module 138. RDMS module 134, execution module 136, and OS module 138 operate similarly to RDMS module 114, execution module 116, and OS module 118, respectively, as described above with reference to development system 102. Persons skilled in the relevant art(s) will recognize that database creation system 100 need not necessarily include execution system 104.

It will be recognized that automated database creator 112 may be implemented in various ways to translate programming language patterns into database schema patterns, including being implemented in hardware, software, firmware, or any combination thereof. For example, automated database creator 112 may be implemented as computer program code configured to be executed in one or more processors. In another example, automated database creator 112 may be implemented as hardware logic/electrical circuitry. In an embodiment, automated database creator 112 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
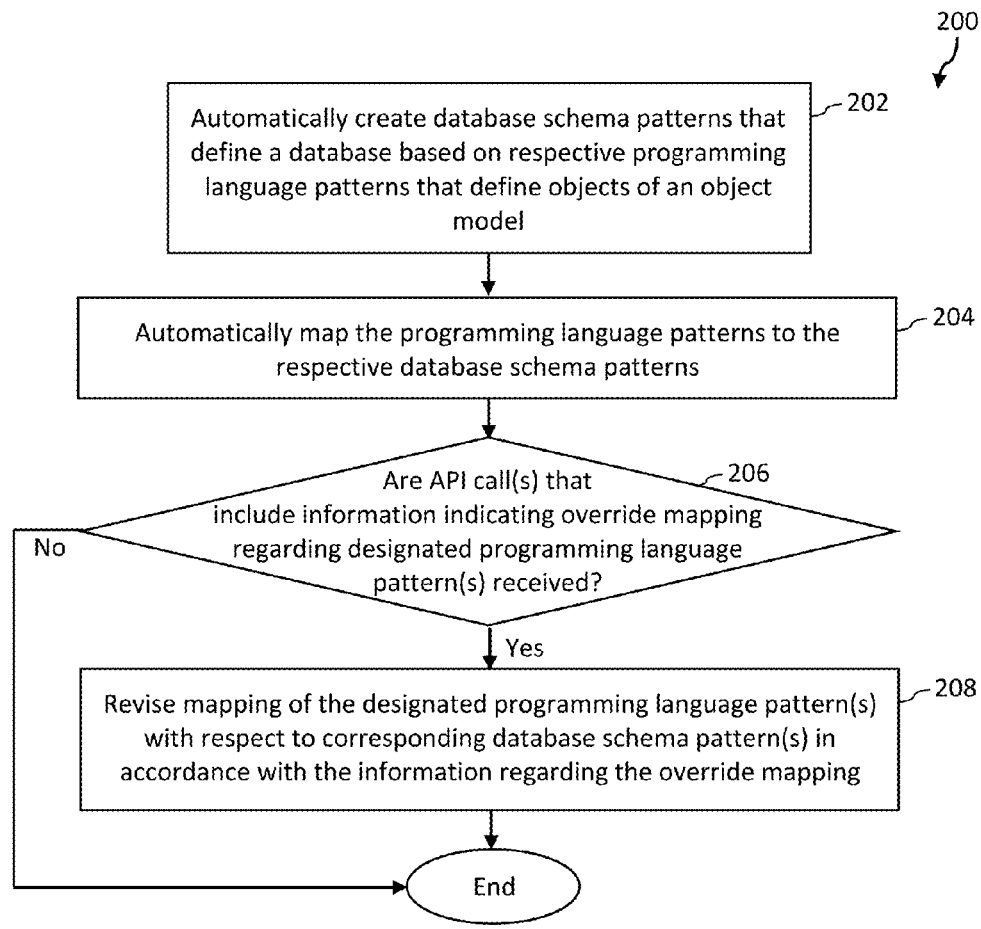
FIGS. 2 and 3 depict flowcharts of example methods for translating programming language patterns into database schema patterns in accordance with embodiments.
Figure 4:
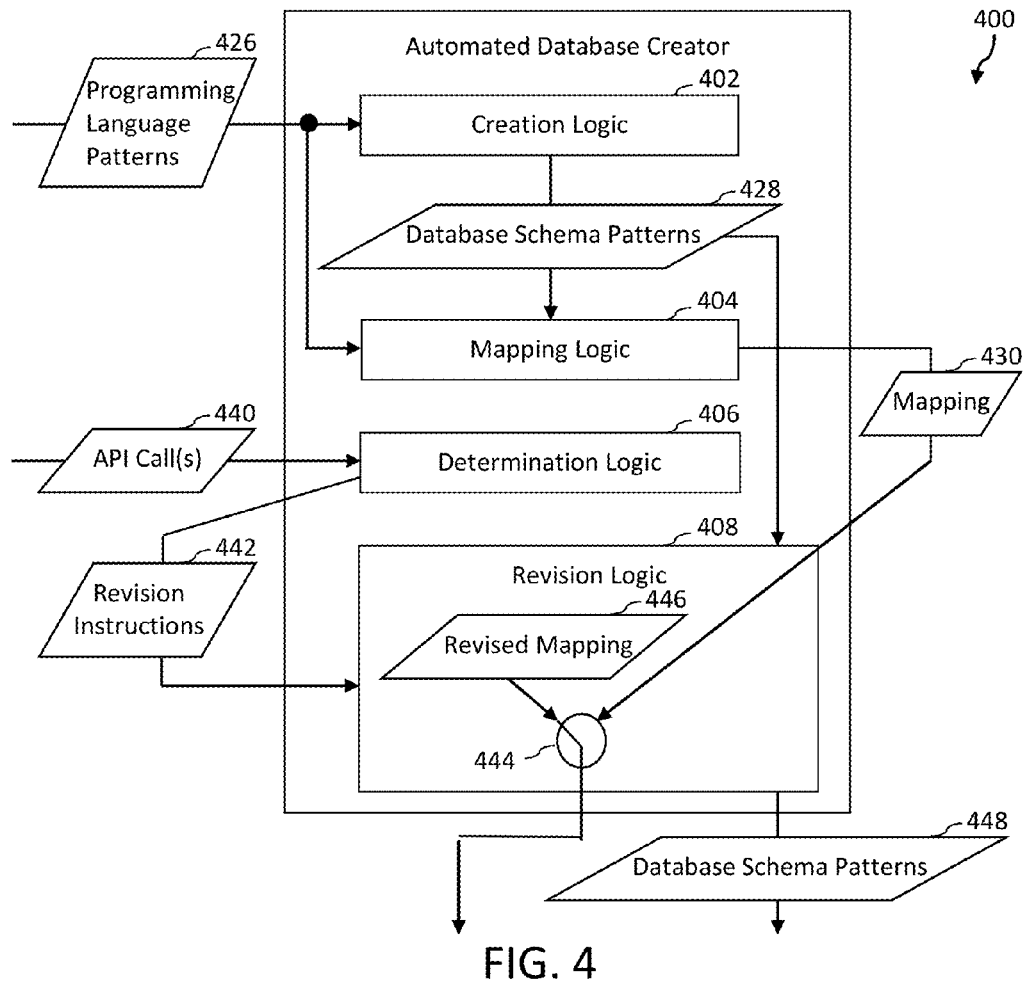
FIG. 4 is a block diagram of an example implementation of an automated database creator shown in FIG. 1 in accordance with an embodiment.

FIG. 2 depicts a flowchart 200 of an example method for translating programming language patterns into database schema patterns in accordance with an embodiment. Flowchart 200 may be performed by automated database creator 112 of database creation system 100 shown in FIG. 1, for example. For illustrative purposes, flowchart 200 is described with respect to an automated database creator 400 shown in FIG. 4, which is an example of an automated database creator 112, according to an embodiment. As shown in FIG. 4, automated database creator 400 includes creation logic 402, mapping logic 404, determination logic 406, and revision logic 408. Further structural and operational embodiments will be apparent to persons skilled in the relevant art(s) based on the discussion regarding flowchart 200.

As shown in FIG. 2, the method of flowchart 200 begins at step 202. In step 202, database schema patterns that define a database are automatically created based on respective programming language patterns that define objects of an object model. For instance, the database schema patterns may be automatically inferentially created based on the respective programming language patterns. The database schema patterns may be automatically created at runtime of an application having intermediate code that includes the programming language patterns. In an example implementation, creation logic 402 automatically creates database schema patterns 428 based on respective programming language patterns 426.

In an example embodiment, automatically creating the database schema patterns at step 202 includes automatically (e.g., inferentially) generating a script (e.g., a data definition language (DDL) script) based on the programming language patterns. In accordance with this embodiment, the script is executed to generate the database schema patterns. The database schema patterns may be automatically created based on information in addition to the programming language patterns. For instance, the database schema patterns maybe automatically created further based on loading configuration data from a configuration file or any other suitable information.

At step 204, the programming language patterns are automatically mapped to the respective database schema patterns. In an example implementation, mapping logic 404 automatically maps the programming language patterns 426 to the respective database schema patterns 428. Mapping logic 404 provides mapping 430, which includes information regarding the mapping of the programming language patterns 426 to the respective database schema patterns 428.

At step 206, a determination is made whether API call(s) that include information indicating override mapping regarding designated programming language pattern(s) are received. If API call(s) that include information indicating override mapping regarding designated programming language pattern(s) are received, flow continues to step 208. Otherwise, flowchart 200 ends. In an example implementation, determination logic 406 determines whether API call(s) 440 that include information indicating override mapping regarding designated programming language pattern(s) of the programming language patterns 426 are received. In accordance with this example implementation, if determination logic 406 receives API call(s) 440, determination logic 406 provides revision instructions 442 to revision logic 408, so that revised mapping 446 may be provided as an output of automated database creator 400. Revision instructions 442 include the information indicating the override mapping. If determination logic 406 does not receive API call(s) 440, determination logic 406 does not provide revision instructions 442 to revision logic 408, so that mapping 430 may be provided as an output of automated database creator 400.

At step 208, mapping of the designated programming language pattern(s) with respect to corresponding database schema pattern(s) is revised in accordance with the information regarding the override mapping.

In an example implementation, if revision logic 408 receives revision instructions 442, revision logic 408 revises the mapping regarding the designated programming language pattern(s) and provides revised mapping 446 in lieu of mapping 430 as an output of automated database creator 400. Revised mapping 446 includes information regarding the revised mapping of the designated programming language pattern(s). Revision logic 408 is shown to include a switch 444 for illustrative purposes. Revision logic 408 may cause switch 444 to select revised mapping 446 and not mapping 430 to be provided as an output. In one example, revised mapping 446 may indicate that the designated programming language pattern(s) are to be mapped to respective replacement database schema pattern(s). In accordance with this example, revision logic 408 may modify the database schema patterns 428 to include the replacement database schema pattern(s) in lieu of the corresponding database schema patterns that were automatically created at step 202 to provide database schema patterns 448. In another example, revised mapping 446 may indicate that the designated programming language pattern(s) are to be mapped to respective revised data schema pattern(s), which are revised versions of the corresponding database schema patterns that were automatically created at step 202. In accordance with this example, revision logic 408 may modify the database schema patterns 428 to include the revised versions of the database schema patterns that correspond to the designated programming language pattern(s) to provide the database schema patterns 448. The replacement database schema pattern(s) and/or the revised database schema pattern(s) may be generated and/or provided in accordance with revision instructions 442.

In accordance with this example implementation, if revision logic 408 does not receive revision instructions 442, revision logic 408 does not revise the mapping of the programming language patterns 426. Accordingly, revision logic 408 provides mapping 430 as an output of automated database creator 400. For instance, revision logic 408 may cause switch 444 to select mapping 430 to be provided as an output. If revision logic 408 does not receive revision instructions 442, database schema patterns 448 are unchanged from database schema patterns 428.

In an example embodiment, automatically creating the database schema patterns at step 202 may include automatically creating table(s) in the database based on respective class(es) that are defined by the programming language patterns. For instance, the table(s) may be automatically inferentially created based on the respective class(es). In an aspect of this embodiment, automatically creating the database schema patterns at step 202 may further include automatically identifying a reference from a first class that is defined by a first programming language pattern to a second class that is defined by a second programming language pattern. In accordance with this aspect, a foreign key may be automatically generated in a first table that corresponds to the first class based on the reference. The foreign key corresponds to a candidate key in a second table that corresponds to the second class. The foreign key may be automatically generated inferentially, though the scope of the embodiments is not limited in this respect.

In another aspect of the aforementioned embodiment, automatically creating the database schema patterns at step 202 may further include automatically identifying a many-to-many relationship between first properties of a first class that is defined by a first programming language pattern and second properties of a second class that is defined by a second programming language pattern. In accordance with this aspect, a join table that includes fields that are in common with respect to a first table that corresponds to the first class and a second table that corresponds to the second class is automatically created based on the many-to-many relationship. For instance, the join table may be automatically inferentially created based on the many-to-many relationship.

In one example implementation of this aspect, the first class may be an Employee class and the second class may be a Territory class. Each employee in the Employee class may be assigned to one or more territories in the Territory class. Each territory in the Territory class may be supported by one or more employees. Accordingly, the Employee class has a collection of territories for each employee, and the Territory class has a collection of employees that support each territory. Such a relationship between the employees in the Employee class and the territories in the Territory class may be automatically identified as a many-to-many relationship at step 202. For instance, the many-to-many relationship may be determined based on a convention.

In yet another aspect of the aforementioned embodiment, automatically creating the tables in the database may include determining table names for the respective tables based on class names for the respective classes. For example, the table names may be determined inferentially based on the class names of the respective classes. In another example, a table name may be determined to be a plural of a class name for the respective class. For instance, if the class has a class name of Customer, the corresponding table name may be determined to be Customers; if the class has a class name of Territory, the corresponding table name may be determined to be Territories, etc.

In still another aspect of the aforementioned embodiment, automatically creating the tables in the database may include automatically creating columns in a designated table of the database based on properties regarding a designated class. For instance, the columns may be automatically inferentially created in the designated table based on the properties. Each of the columns of the designated table corresponds to a respective property regarding the designated class. In accordance with this aspect, automatically creating the tables may further include automatically determining column names for the respective columns based on property names for the respective properties. For instance, the column names may be automatically determined inferentially based on the property names. In further accordance with this aspect, automatically creating the tables may further include automatically assigning a column name to a designated column in the designated table based on the column name being specified by a data annotation that is associated with a designated property regarding the designated class. A data annotation is a declarative representation of explicit information that is associated with a class or a property thereof. The designated property corresponds to the designated column. In yet further accordance with this aspect, an API call that specifies a column name to be assigned to a designated column in the designated table that corresponds to a designated property regarding the designated class may be received in response to automatically creating the columns in the designated table. The column name may be assigned to the designated column in response to receiving the API call.

In some example embodiments, one or more steps 202, 204, 206, and/or 208 of flowchart 200 may not be performed. Moreover, steps in addition to or in lieu of steps 202, 204, 206, and/or 208 may be performed. For example, a data annotation that is associated with a property that is defined by a designated programming language pattern may be received. For instance, creation logic 402 may receive the data annotation. The data annotation may include information regarding a relationship between the property and a column of a table in the database. In accordance with this example, automatically mapping the programming language patterns to the respective database schema patterns at step 204 may include automatically mapping the property to the column based on the information.

Figure 3:
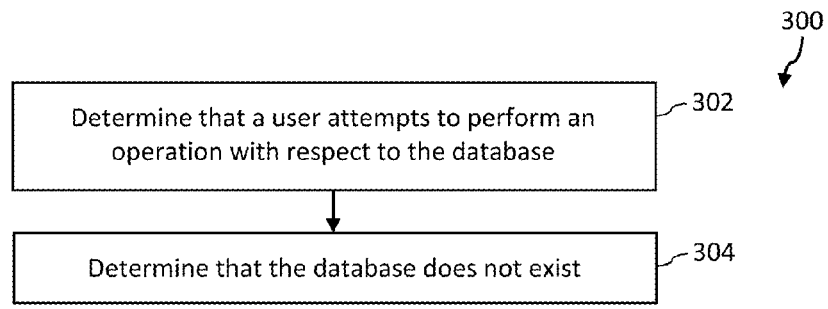

In another example, the steps shown in flowchart 300 of FIG. 3 may be incorporated into flowchart 200. For instance, steps 202, 204, 206, and 208 may be performed in response to performance of the steps shown in FIG. 3. Flowchart 300 is described with reference to automated database creator 400 for illustrative purposes. Further structural and operational embodiments will be apparent to persons skilled in the relevant art(s) based on the discussion regarding flowchart 300.

As shown in FIG. 3, the method of flowchart 300 begins at step 302. In step 302, a determination is made that a user attempts to perform an operation with respect to the database. In an example implementation, determination module 406 determines that the user attempts to perform an operation with respect to the database.

At step 304, a determination is made that the database does not exist. In an example implementation, determination module 406 determines that the database does not exist.

The steps shown in FIG. 3 describe one example trigger for automatically creating the database schema patterns based on the respective programming language patterns. It will be recognized that other events and/or operations may trigger the automatic creation of the database based on the respective programming language patterns. For example, a determination may be made that a user attempts to use the object model that includes the object defined by the programming language patterns. In accordance with this example, the user may attempt to access an object, modify an object, etc. In further accordance with this example, the user may attempt to add an entity to a context class that defines a relationship between the programming language patterns and the database schema patterns. Some example techniques for triggering automatic creation of database schema patterns based on programming language patterns are described in U.S. patent application Ser. No. 13/179,598 entitled "Object-Relational Mapped Database Initialization" filed on 11 Jul. 2011, the entirety of which is incorporated herein by reference.

It will be recognized that automated database creator 400 may not include one or more of creation logic 402, mapping logic 404, and/or determination logic 406. Furthermore, automated database creator 400 may include modules in addition to or in lieu of creation logic 402, mapping logic 404, and/or determination logic 406.

Figure 5:
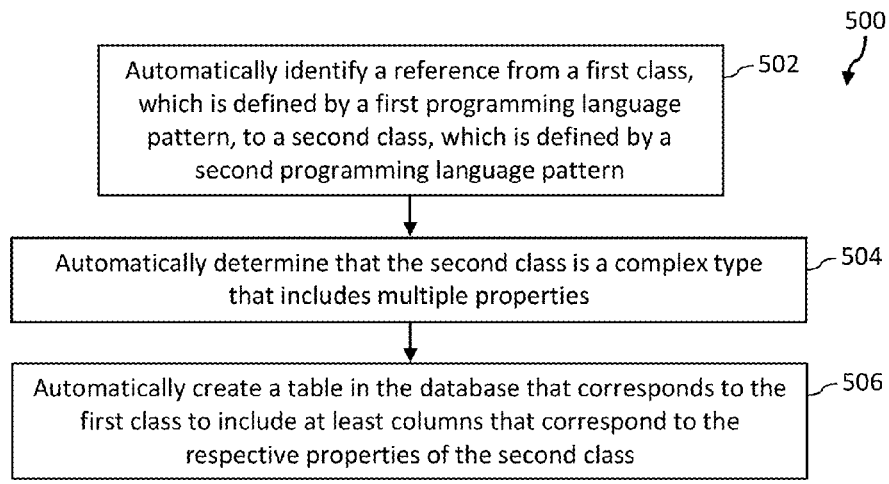
FIGS. 5 and 6 depict flowcharts of example methods for automatically creating database schema patterns based on programming language patterns in accordance with embodiments.
Figure 6:
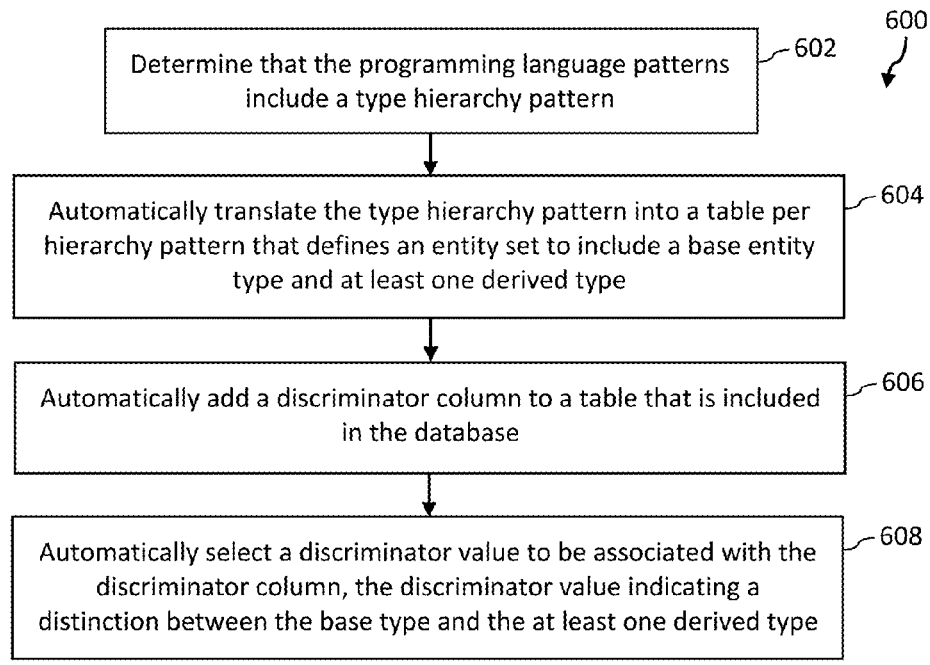
Figure 7:
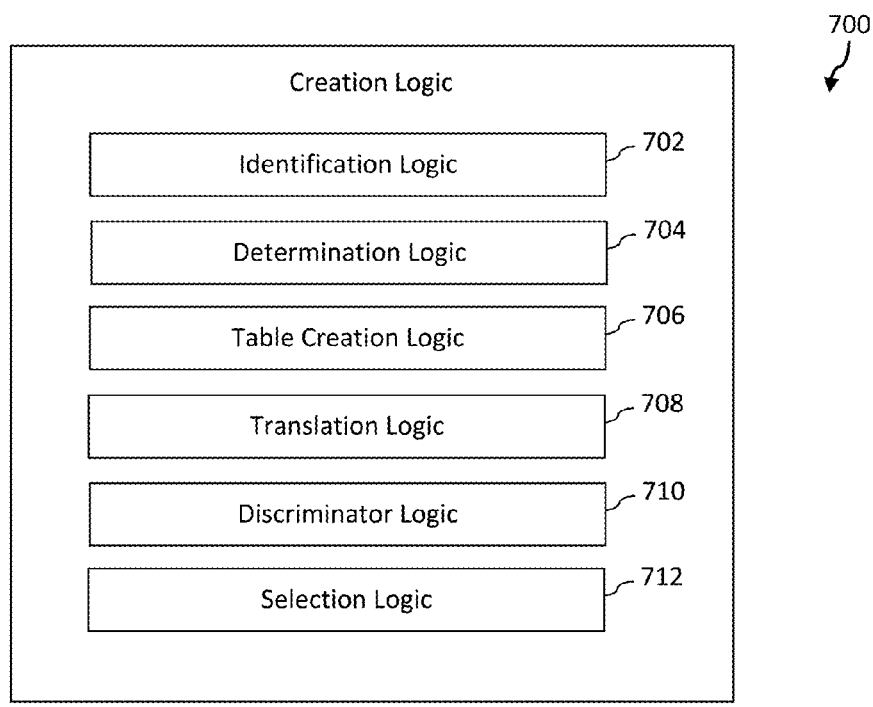
FIG. 7 is a block diagram of an example implementation of creation logic shown in FIG. 4 in accordance with an embodiment.

FIGS. 5 and 6 depict flowcharts 500 and 600 of example methods for implementing step 202 shown in FIG. 2 in accordance with embodiments. Flowcharts 500 and 600 may be performed by creation logic 402 of automated database creator 400 shown in FIG. 4, for example. For illustrative purposes, flowcharts 500 and 600 are described with respect to creation logic 700 shown in FIG. 7, which is an example of creation logic 402, according to an embodiment. As shown in FIG. 7, creation logic 700 includes identification logic 702, determination logic 704, table creation logic 706, translation logic 708, discriminator logic 710, and selection logic 712. Further structural and operational embodiments will be apparent to persons skilled in the relevant art(s) based on the discussion regarding flowcharts 500 and 600.

As shown in FIG. 5, the method of flowchart 500 begins at step 502. In step 502, a reference is automatically identified from a first class to a second class. The first class is defined by a first programming language pattern. The second class is defined by a second programming language pattern. In an example implementation, identification logic 702 automatically identifies the reference from the first class to the second class.

At step 504, a determination that the second class is a complex type that includes multiple properties is automatically made. For instance, the determination that the second class is a complex type may be automatically made based on a data annotation that indicates that the second class is a complex type. In an example implementation, determination logic 704 automatically determines that the second class is a complex type that includes multiple properties.

At step 506, a table is automatically created in the database. For instance, the table may be automatically inferentially created in the database. The table corresponds to the first class and includes at least columns that correspond to the respective properties of the second class. In an example implementation, table creation logic 706 automatically creates the table in the database.

In one example embodiment, the first class is a Customer class and the second class is an Address class. The Customer class includes a reference to the Address class. For instance, each customer of the Customer class may have a corresponding address in the Address class. A determination may be made at step 504 that the Address class is a complex type based on the Address class having a street property, a city property, and a zip code property. A Customer table may be automatically created in the database at step 506, such that the Customer table includes at least a street column, a city column, and a zip code column.

As shown in FIG. 6, the method of flowchart 600 begins at step 602. In step 602, a determination is made that the programming language patterns include a type hierarchy pattern. In an example implementation, determination logic 704 determines that the programming language patterns include a type hierarchy pattern.

At step 604, the type hierarchy pattern is automatically translated into a table per hierarchy pattern that defines an entity set. An entity set is a logical container for instances of an entity type and instances of any type derived from that entity type. For instance, properties of the type hierarchy pattern may be converted from a hierarchical arrangement to a linear arrangement so that they fit into one table. The entity set includes a base entity type and at least one derived type. In an example implementation, translation logic 708 automatically translates the type hierarchy pattern into the table per hierarchy pattern.

At step 606, a discriminator column is automatically added to a table that is included in the database. In an example implementation, discriminator logic 710 automatically adds the discriminator column to a table that is included in the database.

At step 608, a discriminator value is automatically selected to be associated with the discriminator column. The discriminator value indicates a distinction between the base type and the at least one derived type. In an example implementation, selection logic 712 automatically selects the discriminator value to be associated with the discriminator column.

In an example embodiment, the table per hierarchy pattern defines an entity set to include a base class of Customer and a derived class of SpecialCustomer. A Customer table is to include the properties of the Customer class and the properties of the SpecialCustomer class. A discriminator column may be automatically added to the Customer table at step 606. A discriminator value of SpecialCustomer may be automatically selected to be associated with the discriminator column at step 608. For instance, if a query were performed with respect to the table, a determination may be made that a column of the table corresponds to a customer, and the type SpecialCustomer may be created in response to the discriminator value being selected to be SpecialCustomer.

It will be recognized that the type hierarchy pattern may be automatically translated into an inheritance type hierarchy pattern other than the table per hierarchy pattern. Examples of other types of patterns include but are not limited to a table per type pattern, a table per concrete pattern, etc. A type hierarchy pattern may be automatically translated into another type of pattern based on data annotations and/or APIs. Moreover, such data annotations and/or APIs may be used to specify the discriminator value to be associated with the discriminator column.

It will be recognized that creation logic 700 may not include one or more of identification logic 702, determination logic 704, table creation logic 706, translation logic 708, discriminator logic 710, and/or selection logic 712. Furthermore, creation logic 700 may include modules in addition to or in lieu of identification logic 702, determination logic 704, table creation logic 706, translation logic 708, discriminator logic 710, and/or selection logic 712.

Programming editor 108, intermediate code compiler 110, automated database creator 112, RDMS module 114, execution module 116, OS module 118, API module 120, RDMS module 134, execution module 136, OS module 138, creation logic 402, mapping logic 404, determination logic 406, revision logic 408, switch 444, identification logic 702, determination logic 704, table creation logic 706, translation logic 708, discriminator logic 710, selection logic 712, and flowcharts 200, 300, 500, and 600 may be implemented in hardware, software, firmware, or any combination thereof.

For example, programming editor 108, intermediate code compiler 110, automated database creator 112, RDMS module 114, execution module 116, OS module 118, API module 120, RDMS module 134, execution module 136, OS module 138, creation logic 402, mapping logic 404, determination logic 406, revision logic 408, switch 444, identification logic 702, determination logic 704, table creation logic 706, translation logic 708, discriminator logic 710, selection logic 712, flowchart 200, flowchart 300, flowchart 500, and/or flowchart 600 may be implemented as computer program code configured to be executed in one or more processors.

In another example, programming editor 108, intermediate code compiler 110, automated database creator 112, RDMS module 114, execution module 116, OS module 118, API module 120, RDMS module 134, execution module 136, OS module 138, creation logic 402, mapping logic 404, determination logic 406, revision logic 408, switch 444, identification logic 702, determination logic 704, table creation logic 706, translation logic 708, discriminator logic 710, selection logic 712, flowchart 200, flowchart 300, flowchart 500, and/or flowchart 600 may be implemented as hardware logic/electrical circuitry. For instance, in an embodiment, one or more of programming editor 108, intermediate code compiler 110, automated database creator 112, RDMS module 114, execution module 116, OS module 118, API module 120, RDMS module 134, execution module 136, OS module 138, creation logic 402, mapping logic 404, determination logic 406, revision logic 408, switch 444, identification logic 702, determination logic 704, table creation logic 706, translation logic 708, discriminator logic 710, selection logic 712, flowchart 200, flowchart 300, flowchart 500, and/or flowchart 600 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
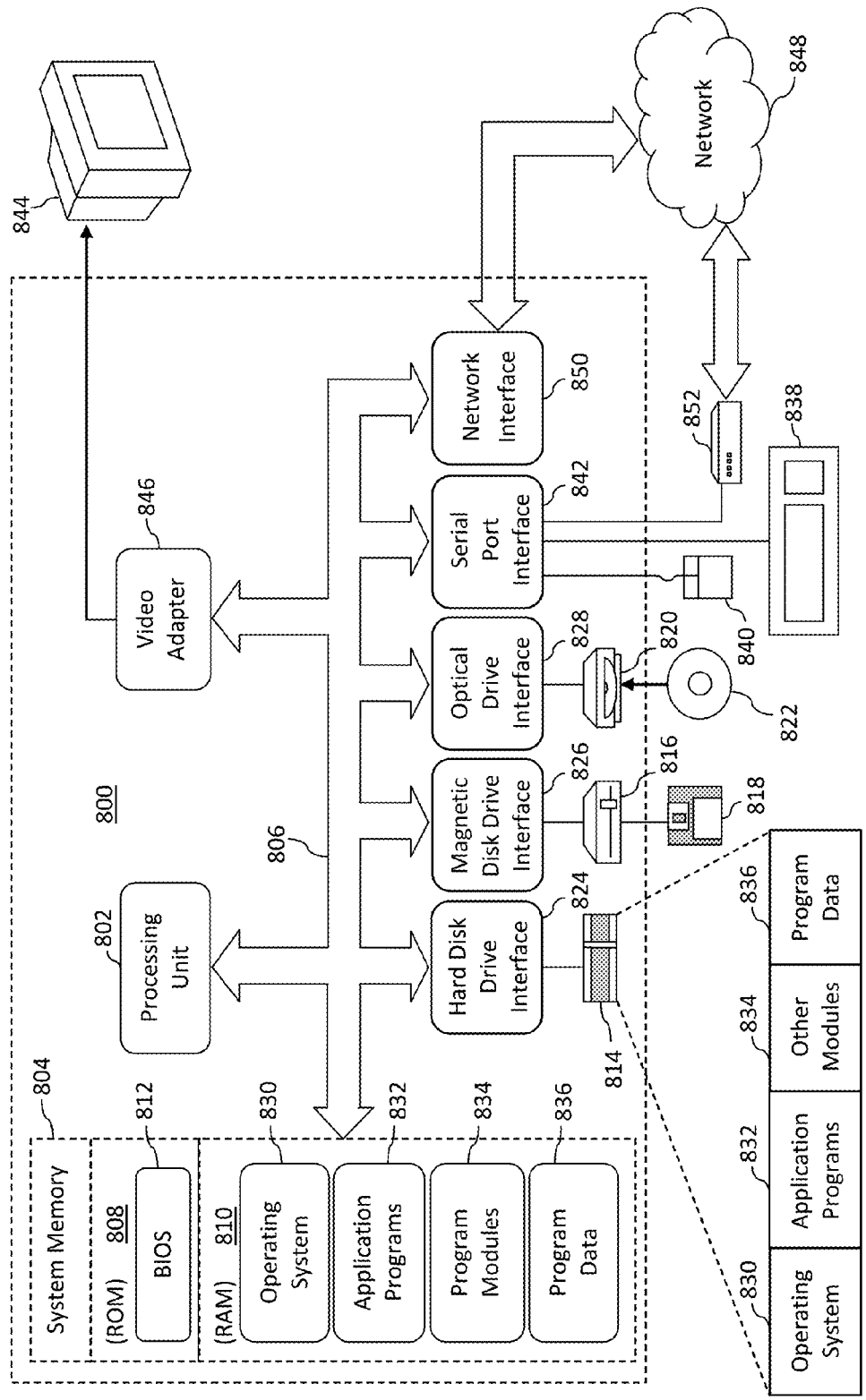
FIG. 8 depicts an example computer in which embodiments may be implemented.

FIG. 8 depicts an example computer 800 in which embodiments may be implemented. Execution system 104 or development system 102 shown in FIG. 1 (or any one or more subcomponents thereof shown in FIGS. 4 and 7) may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing programming editor 108, intermediate code compiler 110, automated database creator 112, RDMS module 114, execution module 116, OS module 118, API module 120, RDMS module 134, execution module 136, OS module 138, creation logic 402, mapping logic 404, determination logic 406, revision logic 408, switch 444, identification logic 702, determination logic 704, table creation logic 706, translation logic 708, discriminator logic 710, selection logic 712, flowchart 200 (including any step of flowchart 200), flowchart 300 (including any step of flowchart 300), flowchart 500 (including any step of flowchart 500), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable medium" are used to generally refer to media such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A system comprising:
   creation logic that comprises electrical circuitry and is configured to automatically inferentially create a plurality of database schema patterns that defines a database based on a plurality of respective programming language patterns that defines objects of an object model,
   the creation logic configured to automatically create a plurality of tables in the database inferentially based on a plurality of respective classes that are defined by the plurality of respective programming language patterns,
   the creation logic further configured to automatically identify a many-to-many relationship between a first plurality of properties of a first class that is defined by a first programming language pattern of the plurality of programming language patterns and a second plurality of properties of a second class that is defined by a second programming language pattern of the plurality of programming language patterns,
   the creation logic further configured to automatically inferentially create a join table that includes a plurality of fields that are in common with respect to a first table of the plurality of tables that corresponds to the first class and a second table of the plurality of tables that corresponds to the second class based on the many-to-many relationship; and
   mapping logic configured to automatically map the plurality of programming language patterns to the plurality of respective database schema patterns in response to creating the plurality of database schema patterns.

2. The system of claim 1, further comprising:
   a relational database management system configured to translate the plurality of database schema patterns back into the plurality of respective programming language patterns based on mapping of the plurality of programming language patterns to the plurality of respective database schema patterns by the mapping logic.

3. The system of claim 1, wherein the creation logic is configured to automatically generate a script based on the plurality of programming language patterns, the script configured to generate the plurality of database schema patterns.

4. The system of claim 1, wherein the creation logic is configured to automatically inferentially create the plurality of database schema patterns further based on loading configuration data from a configuration file.

5. The system of claim 1, wherein the creation logic is configured to determine a name for a designated table of the plurality of tables to be a plural of a class name of a designated class of the plurality of classes.

6. The system of claim 1, further comprising:
   determination logic configured to determine whether a user attempts to perform an operation with respect to the database, the determination logic further configured to determine whether the database exists;
   wherein the creation logic is configured to automatically create the plurality of database schema patterns in response to a determination that a user attempts to perform an operation with respect to the database and further in response to a determination that the database does not exist.

7. The system of claim 1, wherein the creation logic comprises:
   determination logic configured to determine whether the plurality of programming language patterns includes a type hierarchy pattern;
   translation logic configured to automatically translate the type hierarchy pattern into a table per type pattern that defines an entity set to include a base entity type and at least one derived type;
   discriminator logic configured to automatically add a discriminator column to a table that is included in the database; and
   selection logic configured to automatically select a discriminator value to be associated with the discriminator column, the discriminator value indicating a distinction between the base type and the at least one derived type.

8. The system of claim 1, wherein the creation logic comprises:
   determination logic configured to determine whether the plurality of programming language patterns includes a type hierarchy pattern;
   translation logic configured to automatically translate the type hierarchy pattern into a table per concrete pattern that defines an entity set to include a base entity type and at least one derived type;
   discriminator logic configured to automatically add a discriminator column to a table that is included in the database; and
   selection logic configured to automatically select a discriminator value to be associated with the discriminator column, the discriminator value indicating a distinction between the base type and the at least one derived type.

9. A system comprising:
   creation logic that comprises electrical circuitry and is configured to automatically inferentially create a plurality of database schema patterns that defines a database based on a plurality of respective programming language patterns that defines objects of an object model, the creation logic comprising:
      determination logic configured to determine whether the plurality of programming language patterns includes a type hierarchy pattern,
      translation logic configured to automatically translate the type hierarchy pattern into a table per hierarchy pattern that defines an entity set to include a base entity type and at least one derived type,
      discriminator logic configured to automatically add a discriminator column to a table that is included in the database, and
      selection logic configured to automatically select a discriminator value to be associated with the discriminator column, the discriminator value indicating a distinction between the base type and the at least one derived type; and
   mapping logic configured to automatically map the plurality of programming language patterns to the plurality of respective database schema patterns in response to creating the plurality of database schema patterns.

10. The system of claim 9, wherein the selection logic is configured to automatically select the discriminator value based on a data annotation that specifies the discriminator value.

11. The system of claim 9, wherein the selection logic is configured to automatically select the discriminator value based on receipt of an application programming interface call that specifies the discriminator value.

12. The system of claim 9, wherein the translation logic is configured to convert properties of the type hierarchical pattern from a hierarchical arrangement to a linear arrangement.

13. The system of claim 9, wherein the translation logic is configured to automatically translate the type hierarchy pattern into one of a plurality of inheritance type hierarchy patterns based on which inheritance type hierarchy pattern of the plurality of inheritance type hierarchy patterns is specified by a data annotation.

14. The system of claim 9, wherein the translation logic is configured to automatically translate the type hierarchy pattern into one of a plurality of inheritance type hierarchy patterns based on which inheritance type hierarchy pattern of the plurality of inheritance type hierarchy patterns is specified by a received application programming interface call.

15. A system comprising:
   creation logic that comprises electrical circuitry and is configured to automatically inferentially create a plurality of database schema patterns that defines a database based on a plurality of respective programming language patterns that defines objects of an object model, the creation logic comprising:
      identification logic configured to automatically identify a reference from a first class that is defined by a first programming language pattern of the plurality of programming language patterns to a second class that is defined by a second programming language pattern of the plurality of programming language patterns,
      determination logic configured to automatically determine whether the second class is a complex type that includes a plurality of properties, and
      table creation logic configured to automatically inferentially create a table in the database that corresponds to the first class to include at least a plurality of columns that corresponds to the plurality of respective properties in response to a determination that the second class is a complex type that includes a plurality of properties; and
   mapping logic configured to automatically map the plurality of programming language patterns to the plurality of respective database schema patterns in response to creating the plurality of database schema patterns.

16. The system of claim 15, further comprising:
   a relational database management system configured to translate the plurality of database schema patterns back into the plurality of respective programming language patterns based on mapping of the plurality of programming language patterns to the plurality of respective database schema patterns by the mapping logic.

17. The system of claim 15, wherein the creation logic is configured to determine a name for a designated table of the plurality of tables to be a plural of a class name of a designated class of the plurality of classes.

18. The system of claim 15, wherein the determination logic is further configured to determine whether a user attempts to perform an operation with respect to the database, the determination logic further configured to determine whether the database exists; and
   wherein the creation logic is configured to automatically create the plurality of database schema patterns in response to a determination that a user attempts to perform an operation with respect to the database and further in response to a determination that the database does not exist.

19. The system of claim 15, wherein the determination logic is further configured to determine whether the plurality of programming language patterns includes a type hierarchy pattern; and wherein the creation logic further comprises:
translation logic configured to automatically translate the type hierarchy pattern into a table per type pattern that defines an entity set to include a base entity type and at least one derived type;
discriminator logic configured to automatically add a discriminator column to a table that is included in the database; and
selection logic configured to automatically select a discriminator value to be associated with the discriminator column, the discriminator value indicating a distinction between the base type and the at least one derived type.

20. The system of claim 15, wherein the determination logic is further configured to determine whether the plurality of programming language patterns includes a type hierarchy pattern; and wherein the creation logic further comprises:
translation logic configured to automatically translate the type hierarchy pattern into a table per concrete pattern that defines an entity set to include a base entity type and at least one derived type;
discriminator logic configured to automatically add a discriminator column to a table that is included in the database; and
selection logic configured to automatically select a discriminator value to be associated with the discriminator column, the discriminator value indicating a distinction between the base type and the at least one derived type.

* * * * *